United States Patent
Pan (10) Patent No.: US 12,481,446 B2
(45) Date of Patent: Nov. 25, 2025

(54) INTELLIGENT PERFORMANCE MODE SELECTION TO MANAGE QUALITY OF SERVICE

(71) Applicant: Micron Technology, Inc., Boise, ID (US)

(72) Inventor: Lei Pan, Shanghai (CN)

(73) Assignee: MICRON TECHNOLOGY, INC., Boise, ID (US)

( * ) Notice: Subject to any disclaimer, the term of this patent is extended or adjusted under 35 U.S.C. 154(b) by 5 days.

(21) Appl. No.: 18/629,767

(22) Filed: Apr. 8, 2024

(65) Prior Publication Data

US 2024/0345754 A1 Oct. 17, 2024

Related U.S. Application Data

(60) Provisional application No. 63/495,386, filed on Apr. 11, 2023.

(51) Int. Cl.
*G06F 3/00* (2006.01)
*G06F 3/06* (2006.01)

(52) U.S. Cl.
CPC .......... *G06F 3/0647* (2013.01); *G06F 3/0604* (2013.01); *G06F 3/0679* (2013.01); *G06F 3/0659* (2013.01)

(58) Field of Classification Search
CPC .............................. G06F 3/0647; G06F 3/0659
See application file for complete search history.

(56) References Cited

U.S. PATENT DOCUMENTS

| 5,860,083 A | * | 1/1999 | Sukegawa | G06F 12/0866 |
| | | | | 711/E12.019 |
| 2012/0195118 A1 | * | 8/2012 | Yang | G11C 16/34 |
| | | | | 365/185.03 |
| 2018/0004452 A1 | * | 1/2018 | Ganguli | H04L 41/5025 |
| 2018/0246664 A1 | * | 8/2018 | Wu | G06F 3/0679 |
| 2019/0095321 A1 | * | 3/2019 | Lin | G06F 3/0679 |
| 2019/0187900 A1 | * | 6/2019 | Byun | G06F 3/061 |
| 2020/0210101 A1 | * | 7/2020 | Lin | G06F 3/0679 |
| 2024/0192886 A1 | * | 6/2024 | Yang | G06F 3/0658 |

* cited by examiner

*Primary Examiner* — Reginald G Bragdon
*Assistant Examiner* — Michael L Westbrook
(74) *Attorney, Agent, or Firm* — NICHOLSON DE VOS WEBSTER & ELLIOTT LLP (57) ABSTRACT

Exemplary methods, apparatuses, and systems include a performance mode manager for controlling performance of a wireless update by selecting a performance mode using rations of allocation. The performance mode manager receives a request to initialize a file transfer from a host using wireless communication. In response to the request, the performance mode manager identifies a size of the file transfer by the memory subsystem. The performance mode manager selects a performance mode from a plurality of performance modes and allocates the available set of memory pages using the performance mode. The performance mode manager receives a file of the file transfer. The performance mode manager programs a first portion of the file at the default bit density to the first portion of memory and a second portion of the file at the reduced bit density to the second portion of memory.

20 Claims, 4 Drawing Sheets

INTELLIGENT PERFORMANCE MODE SELECTION TO MANAGE QUALITY OF SERVICE

CROSS-REFERENCE TO RELATED APPLICATION

The present application claims the benefit of U.S. Provisional Patent Application No. 63/495,386 filed on Apr. 11, 2023, which is incorporated by reference herein in its entirety.

TECHNICAL FIELD

The present disclosure generally relates to selecting performance modes in memory subsystems, and more specifically, relates to intelligent performance mode selection.

BACKGROUND ART

A memory subsystem can include one or more memory devices that store data. The memory devices can be, for example, non-volatile memory devices and volatile memory devices. In general, a host system can utilize a memory subsystem to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Aspects of the present disclosure are directed to selecting modes of operation of the memory subsystem. A memory subsystem can be a storage device, a memory module, or a hybrid of a storage device and memory module. Examples of storage devices and memory modules are described below in conjunction with FIG. 1. In general, a host system can utilize a memory subsystem that includes one or more components, such as memory devices that store data. The host system can provide data to be stored at the memory subsystem and can request data to be retrieved from the memory subsystem.

A memory device can be a non-volatile memory device. A non-volatile memory device is a package of one or more dice. One example of non-volatile memory devices is a negative-and (NAND) memory device. Other examples of non-volatile memory devices are described below in conjunction with FIG. 1. The dice in the packages can be assigned to one or more channels for communicating with a memory subsystem controller. Each die can consist of one or more planes. Planes can be grouped into logic units (LUN). For some types of non-volatile memory devices (e.g., NAND memory devices), each plane consists of a set of physical blocks, which are groups of memory cells to store data. A cell is an electronic circuit that stores information.

Depending on the cell type, a cell can store one or more bits of binary information, and has various logic states that correlate to the number of bits being stored. The logic states can be represented by binary values, such as "0" and "1", or combinations of such values. There are various types of cells, such as single-level cells (SLCs), multi-level cells (MLCs), triple-level cells (TLCs), quad-level cells (QLCs), and octo-level cells (OLC). For example, an SLC can store one bit of information and has two logic states.

Operating environments for automotive technology systems have increasingly incorporated sophisticated driver systems and user experience features. Each of these automotive systems can have different Quality of Service (QOS) requirements during run-time execution. The different QOS requirements are due to the functions of the respective automotive system. For example, a data recorder for a black box system has different write performance requirements than an infotainment system or over-the-air update system. In typical memory subsystems, a write boost performance improvement is available, however, these systems are limited to only "on" or "off" for all systems. As a result, these systems lack flexibility to adapt to the performance requirements of each automotive system.

Aspects of the present disclosure address the above and other deficiencies by providing multiple performance modes for a memory subsystem to achieve a QOS for each automotive system. The performance modes are defined based on the size of data to be programmed to memory. Each performance mode defines a ratio of a first set of pages that are allocated at a default bit density and a second set of pages that are allocated at a reduced bit density. The memory subsystem can compute the number of valid pages available for each mode and provide the page counts to the host in response to a request to initiate a file transfer for programming to memory. Depending on the size of data to be programmed, the memory subsystem can select a ratio that optimizes, e.g., programming latency by maximizing the number of pages having a reduced bit density.

Figure 1:
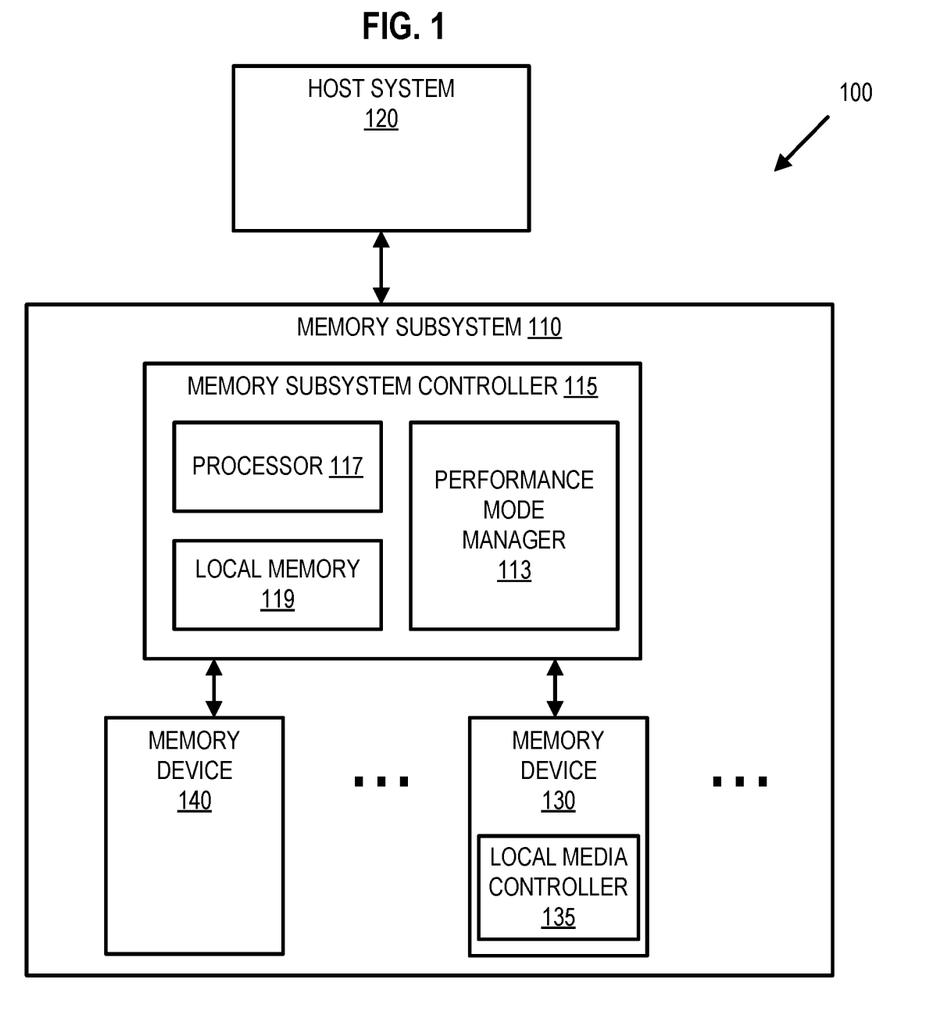
FIG. 1 illustrates an example computing system that includes a memory subsystem in accordance with some embodiments of the present disclosure.

FIG. 1 illustrates an example computing system 100 that includes a memory subsystem 110 in accordance with some embodiments of the present disclosure. The memory subsystem 110 can include media, such as one or more volatile memory devices (e.g., memory device 140), one or more non-volatile memory devices (e.g., memory device 130), or a combination of such.

A memory subsystem 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory subsystems 110. In some embodiments, the host system 120 is coupled to different types of memory subsystems 110. FIG. 1 illustrates one example of a host system 120 coupled to one memory subsystem 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory subsystem 110, for example, to write data to the memory subsystem 110 and read data from the memory subsystem 110.

The host system 120 can be coupled to the memory subsystem 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory subsystem 110. The host system 120 can further utilize an NVM Express (NVMe) interface to access components (e.g., memory devices 130) when the memory subsystem 110 is coupled with the host system 120 by the PCIe interface. The physical host interface can provide an interface for passing control, address, data, and other signals between the memory subsystem 110 and the host system 120. FIG. 1 illustrates a memory subsystem 110 as an example. In general, the host system 120 can access multiple memory subsystems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random-access memory (DRAM) and synchronous dynamic random-access memory (SDRAM).

Some examples of non-volatile memory devices (e.g., memory device 130) include negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Although non-volatile memory devices such as NAND type memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory subsystem controller 115 (or controller 115 for simplicity) can communicate with the memory devices 130 to perform operations such as reading data, writing data, or erasing data at the memory devices 130 and other such operations (e.g., in response to commands scheduled on a command bus by controller 115). The memory subsystem controller 115 can include hardware such as one or more integrated circuits and/or discrete components, a buffer memory, or a combination thereof. The hardware can include digital circuitry with dedicated (i.e., hard-coded) logic to perform the operations described herein. The memory subsystem controller 115 can be a microcontroller, special purpose logic circuitry (e.g., a field programmable gate array (FPGA), an application specific integrated circuit (ASIC), etc.), or another suitable processor.

The memory subsystem controller 115 can include a processing device 117 (processor) configured to execute instructions stored in a local memory 119. In the illustrated example, the local memory 119 of the memory subsystem controller 115 includes an embedded memory configured to store instructions for performing various processes, operations, logic flows, and routines that control operation of the memory subsystem 110, including handling communications between the memory subsystem 110 and the host system 120.

In some embodiments, the local memory 119 can include memory registers storing memory pointers, fetched data, etc. The local memory 119 can also include read-only memory (ROM) for storing micro-code. While the example memory subsystem 110 in FIG. 1 has been illustrated as including the memory subsystem controller 115, in another embodiment of the present disclosure, a memory subsystem 110 does not include a memory subsystem controller 115, and can instead rely upon external control (e.g., provided by an external host, or by a processor or controller separate from the memory subsystem 110).

In general, the memory subsystem controller 115 can receive commands or operations from the host system 120 and can convert the commands or operations into instructions or appropriate commands to achieve the desired access to the memory devices 130 and/or the memory device 140. The memory subsystem controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory subsystem controller 115 can further include host interface circuitry to communicate with the host system 120 via the physical host interface. The host interface circuitry can convert the commands received from the host system into command instructions to access the memory devices 130 and/or the memory device 140 as well as convert responses associated with the memory devices 130 and/or the memory device 140 into information for the host system 120.

The memory subsystem 110 can also include additional circuitry or components that are not illustrated. In some embodiments, the memory subsystem 110 can include a cache or buffer (e.g., DRAM) and address circuitry (e.g., a row decoder and a column decoder) that can receive an address from the memory subsystem controller 115 and decode the address to access the memory devices 130.

In some embodiments, the memory devices 130 include local media controllers 135 that operate in conjunction with memory subsystem controller 115 to execute operations on one or more memory cells of the memory devices 130. An external controller (e.g., memory subsystem controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory subsystem 110 includes a performance mode manager 113 that receives a request to initialize a file transfer from a host using wireless communication. In some embodiments, the controller 115 includes at least a portion of the performance mode manager 113. For example, the controller 115 can include a processor 117 (processing device) configured to execute instructions stored in local memory 119 for performing the operations described herein. In some embodiments, the performance mode manager 113 is part of the host system 120, an application, or an operating system.

The performance mode manager 113 can receive a file transfer from a host using wireless communication. In an example, the performance mode manager 113 receives a request to initialize a file transfer that includes a file from the host. In some embodiments, the performance mode manager 113 and the host 120 communicate using a wireless communication protocol. Examples of the file include images of applications stored in the memory devices 130. The performance mode manager 113 selects a performance mode to provide a performance of the file transfer corresponding to a quality of service (QOS) for each automotive system. The performance mode manager 113 selects a mode that allocates available memory pages using a ratio between a set of pages having a first bit density (e.g., a default bit density) and a different set of pages having a second bit density (e.g., a bit density that is lower than the default bit density). Each performance mode is a set of pre-defined allocations of memory at the different bit densities and that provides an estimated write performance to the host system 120.

In an example, the performance mode manager 113 has multiple performance modes that have defined ratios between sets of pages at the default bit density (e.g., TLC) and other sets of pages at the reduced bit density (e.g., SLC). The performance mode manager 113 selects the ratio by comparing the size of the file transfer to an available set of memory pages. For different sizes of the file transfer, a different performance mode is available. The ratio between the sets of pages results in different write performances for each mode because the write speed of the pages at the reduced bit density is greater than the write speed at the default bit density. In some embodiments, the performance mode manager 113 provides the host system 120 an estimate of the write performance representing a QoS available to the host system 120. In other embodiments, the performance mode manager 113 further configures trim settings that adjust write performance. The performance mode manager can define different trim settings using a common allocation of bit densities as described below.

Figure 2:
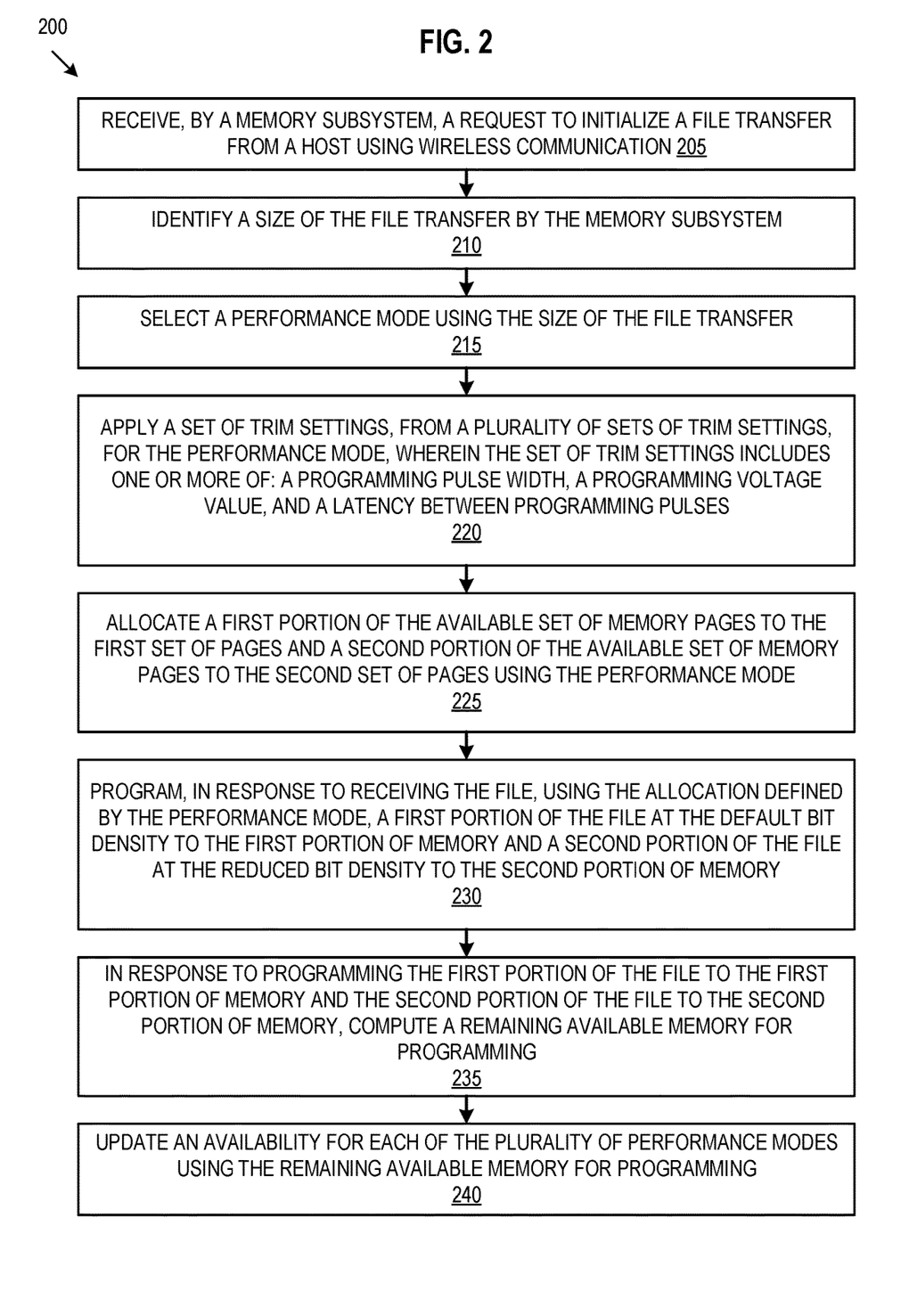
FIG. 2 is a flow diagram of an example method of dynamically selecting operation modes of the memory subsystem in accordance with some embodiments of the present disclosure.

FIG. 2 is a flow diagram of an example method 200 of dynamically selecting operation modes of the memory subsystem in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the performance mode manager 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 205, the performance mode manager 113 receives a request to initialize a file transfer from a host using wireless communication. For example, the performance mode manager 113 receives a request from the host system 120 to write to a file to available memory blocks. In some embodiments, the request includes a requested quality of service that specifies at least a write performance to complete the write operation.

At operation 210, the performance mode manager 113 identifies a size of the file transfer. For example, after receiving the request, the performance mode manager 113 extracts the size of the file from a portion of the request that represents the file transfer size.

At operation 215, the performance mode manager 113 selects a performance mode using the size of the file transfer. The memory subsystem 110 has a number of performance modes that define a quality of service that includes a write latency and an amount of available memory for writing the file transfer to memory. The performance mode manager 113 selects different performance modes for different sizes of the file transfer. For example, the performance mode manager selects the performance mode from the pre-determined set of performance modes available for the host system 120 using the file transfer size and available memory. In some embodiments, the performance mode manager 113 uses the requested QoS to select a performance mode that provides a write performance that satisfies the requested QoS.

In some embodiments, the performance modes provide allocations for how much memory is available to be written at a lower bit density (i.e., lower than a default bit density) using the size of the transfer file as described above. For example, the performance mode manager 113 can maintain performance modes that allocate memory allocations in ratios or similar allotments in increments of percentages or amounts of available memory. As such, performance modes can include allocations of, e.g., 50% of available memory at the default bit density and 50% reallocated to a lower bit density, 55% of available memory at the default bit density and 45% reallocated to the lower bit density, 60% of available memory at the default bit density and 40% reallocated to the lower bit density, etc. In selecting a performance mode, the performance mode manager 113 selects the performance mode that best fits the file transfer using one or more of the size of the file transfer, the amount of available memory, and the requested quality of service.

In an example of a first performance mode, for a memory subsystem having 100 GB of available TLC memory and a file size of 60 GB, a first performance mode defines an allocation of 60% of the 100 GB of TLC to be used as SLC. In this allocation, the first portion of the available memory pages are allocated 20 GB of the file size using SLC (e.g., 60 GB of available TLC memory). The second portion of the available memory pages are set at the default bit density, i.e., 40 GB of TLC. In a second performance mode, the allocation is 15% of the 100 GB of TLC memory to be used as SLC for a file size of 80 GB. In this allocation, the first portion of the available memory pages is allocated 5 GB of SLC (e.g., 15 GB of available TLC memory). The second portion of the available memory pages are set at 85 GB of the default TLC memory.

In another example, in which the memory subsystem has 100 GB of available TLC memory and a file size of 52 GB, the performance mode manager 113 selects the closest defined performance mode that accommodates the file within the available memory. In this example, the performance mode manager 113 selects a performance mode having an allocation of 60% of the 100 GB of TLC to be used as SLC. In this allocation, the first portion of the available memory pages are allocated 20 GB of the file size using SLC (e.g., 60 GB of available TLC memory). The second portion of the available memory pages are set at the default bit density, i.e., 40 GB of TLC. Given that the performance modes define allocations that do not include a ratio that exactly matches the amount of available memory to the file size of 52 GB, the performance mode manager 113 selects a closest fit in allocating 20 GB of SLC and 40 GB of TLC. In such a scenario, the memory subsystem 110 can utilize the entire allocation of SLC memory and 32 GB of the allocation of TLC when programming the file transfer (i.e., the combined amount of the first and second of portions of available memory is greater than the file size).

While the examples above define ratios for a given file size and available amounts of memory, the performance mode manager 113 can select a ratio between SLC and TLC that achieves the requested QoS (e.g., write performance) based on an amount of memory available for programming the transfer file and the file size. In other embodiments, the performance mode manager 113 selects the performance mode using the QoS requested by the host and the QoS (e.g., the write performance) associated with each performance mode. The performance mode QoS is pre-determined by computing an estimate of the write performance from the write speed resulting from the allocation of bit densities. In one embodiment, if multiple performance modes satisfy the QoS requested by the host, the performance mode manager 113 selects the performance mode with the allocation with the least amount of reduced bit density. Additionally, some performance modes are defined by different trim settings that may be selected to optimize write speed. For example, two performance modes with the same allocation may have different trim settings and the performance mode manager 113 selects the performance mode with trim settings that satisfy the QoS requested by the host.

At operation 220, the performance mode manager 113 applies a set of trim settings associated with the performance mode selected at operation 210. The set of trim settings includes one or more of: a programming pulse width, a programming voltage value, and a latency between programming pulses. As described above, the performance mode manager 113 defines multiple performance levels with each performance level having a corresponding set of trim settings. In some embodiments, the performance mode manager 113 provides an estimated latency to the host using the performance mode to compute a latency from the set of trim settings and the ratio of the first set of pages and the second set of pages.

At operation 225, the performance mode manager 113 allocates a first portion of the available set of memory pages to the first set of pages and a second portion of the available set of memory pages to the second set of pages using the performance mode. The performance mode manager 113 uses a ratio of memory between the first portion and the second portion to accommodate the file size within the available memory.

At operation 230, the performance mode manager 113 programs, in response to receiving the file, using the allocation defined by the performance mode, a first portion of the file at the default bit density to the first portion of memory and a second portion of the file at the reduced bit density to the second portion of memory. Revisiting the example above, the performance mode manager 113 writes data to the 20 GB of allocated memory using a bit density of SLC and writes data to the 40 GB of allocated memory using a bit density of TLC.

At operation 235, the performance mode manager 113 computes a remaining available memory for programming in response to programming the first portion of the file to the first portion of memory and the second portion of the file to the second portion of memory. For example, the remaining available memory is computed by reducing availability of the first portion of memory by the first portion of the file and reducing availability of the second portion of memory by the second portion of the file. Revisiting the above example with the performance mode of reallocating 15% of the 100 GB of available TLC memory and a file size of 80 GB, the first portion of the available memory pages are allocated 5 GB of the file size using SLC (e.g., 15 GB of available memory). The second portion of the available memory pages include the remaining 85 GB of TLC. After programming the 80 GB file, the available memory in this programming mode is 10 GB of TLC. During the writing of the 80 GB file, 15 GB of available memory is programmed with 5 GB of bits using the SLC bit density while 65 GB of available memory is programmed using the TLC bit density.

At operation 240, the performance mode manager 113 updates an availability for each of the plurality of performance modes using the remaining available memory for programming. For example, the performance mode manager 113 generates a notification to the host system 120 that indicates an availability of memory for each mode. Returning to the previous example, the notification to the host identifies that in the selected performance mode, 10 GB of TLC is available for programming. The notification indicates to the host whether the remaining availability in the selected performance mode can meet the requested QoS. In some embodiments, the performance mode manager 113 receives a request from the host to erase the file. In response to the request from the host to erase the file, the performance mode manager 113 performs an erase operation on the first portion of the file and the second portion of the file. After performing the erase operation, the performance mode manager 113 updates an amount of the remaining available memory available for additional programming.

Figure 3:
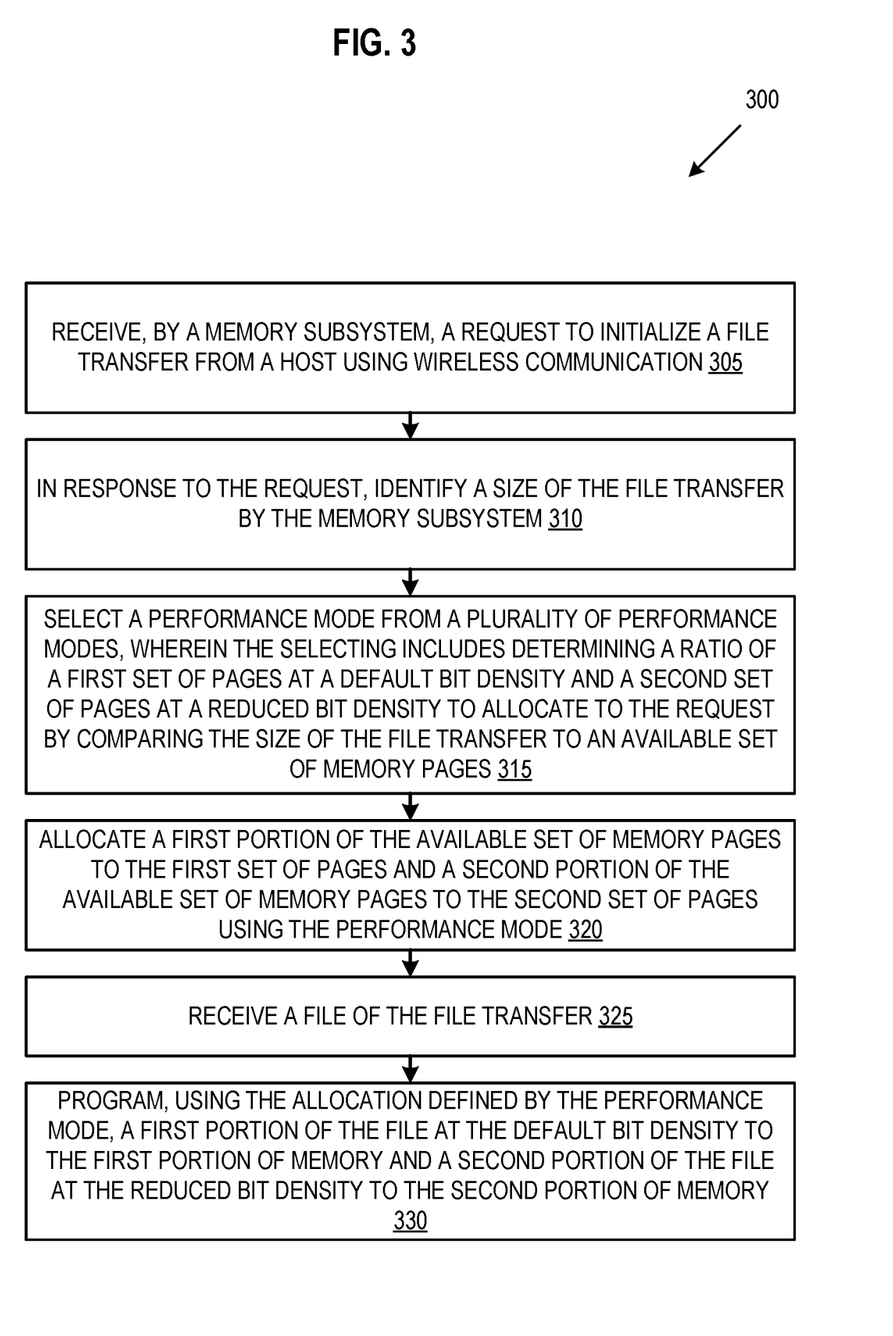
FIG. 3 is a flow diagram of an example method of intelligent performance mode selection in accordance with some embodiments of the present disclosure.

FIG. 3 is a flow diagram of an example method of intelligent performance mode selection in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the performance mode manager 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 305, the performance mode manager 113 receives a request to initialize a file transfer from a host using wireless communication. As described above at operation 205, the update performance manager 113 is communicatively coupled to a network interface device that receives communication from the host system.

At operation 310, the performance mode manager 113 identifies a size of the file transfer by the memory subsystem in response to the request. As described above at operation 210, the size of the file is extracted from the request.

At operation 315, the performance mode manager 113 selects a performance mode from multiple performance modes. As described above with reference to operation 215, the performance mode manager 113 determines a ratio of a first set of pages at a default bit density and a second set of pages at a reduced bit density to allocate to the request by comparing the size of the file transfer to an available set of memory pages. In some embodiments, the performance mode includes a set of trim settings as described above at operation 220.

At operation 320, the performance mode manager 113 allocates a first portion of the available set of memory pages to the first set of pages and a second portion of the available set of memory pages to the second set of pages using the performance mode. As described above with reference to operation 225, the performance mode manager 113 allocates the available set of memory pages using the ratio of portions with different bit densities.

At operation 325, the performance mode manager 113 receives a file of the file transfer as described above at 230. For example, the performance mode manager 113 is communicatively coupled to receive the file from the host system 120.

At operation 330, the performance mode manager 113 programs, using the allocation defined by the performance mode, a first portion of the file at the default bit density to the first portion of memory and a second portion of the file at the reduced bit density to the second portion of memory as described above at operation 235.

Figure 4:
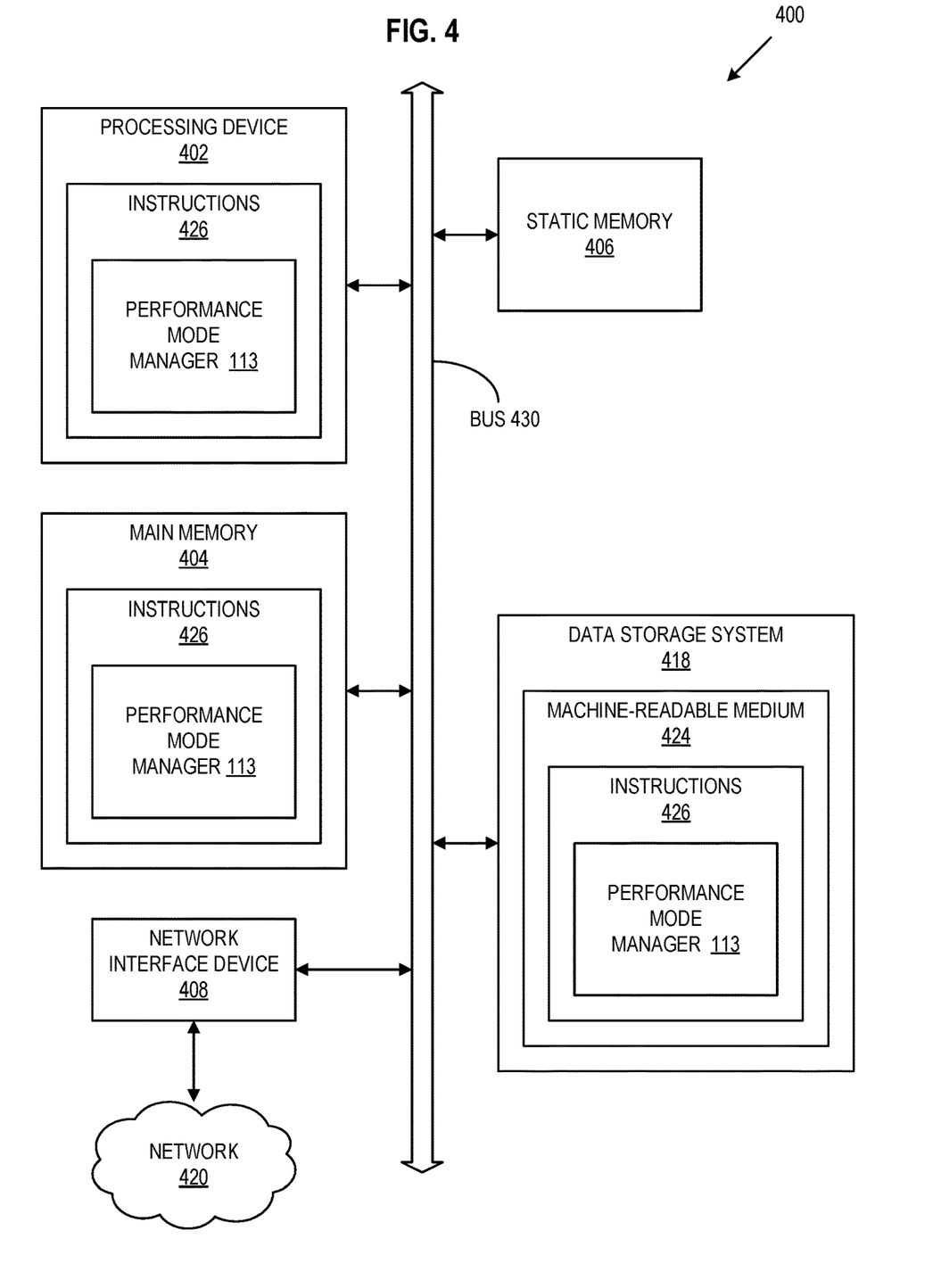
FIG. 4 is a block diagram of an example computer system in which embodiments of the present disclosure may operate.

FIG. 4 illustrates an example machine of a computer system 400 within which a set of instructions, for causing the machine to perform any one or more of the methodologies discussed herein, can be executed. In some embodiments, the computer system 400 can correspond to a host system (e.g., the host system 120 of FIG. 1) that includes, is coupled to, or utilizes a memory subsystem (e.g., the memory subsystem 110 of FIG. 1) or can be used to perform the operations of a controller (e.g., to execute an operating system to perform operations corresponding to performance mode manager 113 of FIG. 1). In alternative embodiments, the machine can be connected (e.g., networked) to other machines in a LAN, an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 400 includes a processing device 402, a main memory 404 (e.g., read-only memory (ROM), flash memory, dynamic random-access memory (DRAM) such as synchronous DRAM (SDRAM) or Rambus DRAM (RDRAM), etc.), a static memory 406 (e.g., flash memory, static random-access memory (SRAM), etc.), and a data storage system 418, which communicate with each other via a bus 430.

Processing device 402 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 402 can also be one or more special-purpose processing devices such as an application specific integrated circuit (ASIC), a field programmable gate array (FPGA), a digital signal processor (DSP), network processor, or the like. The processing device 402 is configured to execute instructions 426 for performing the operations and steps discussed herein. The computer system 400 can further include a network interface device 408 to communicate over the network 420.

The data storage system 418 can include a machine-readable storage medium 424 (also known as a computer-readable medium) on which is stored one or more sets of instructions 426 or software embodying any one or more of the methodologies or functions described herein. The instructions 426 can also reside, completely or at least partially, within the main memory 404 and/or within the processing device 402 during execution thereof by the computer system 400, the main memory 404 and the processing device 402 also constituting machine-readable storage media. The machine-readable storage medium 424, data storage system 418, and/or main memory 404 can correspond to the memory subsystem 110 of FIG. 1.

In one embodiment, the instructions 426 include instructions to implement functionality corresponding to a wireless update performance manager (e.g., the performance mode manager 113 of FIG. 1). While the machine-readable storage medium 424 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the controller 115, may carry out the computer-implemented methods 200 and 300 in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
    receiving, by a memory subsystem, a request to initialize a file transfer from a host using wireless communication;
    in response to the request, identifying a size of the file transfer by the memory subsystem;
    selecting a performance mode from a plurality of performance modes using the size of the file transfer and an available set of memory pages of the memory subsystem, wherein the performance mode indicates a first ratio of a first set of pages at a default bit density and a second set of pages at a reduced bit density, wherein a second performance mode of the plurality of performance modes indicates a second ratio, different from the first ratio, wherein the second ratio is of a third set of pages at the default bit density and a fourth set of pages at the reduced bit density, and wherein a combined amount of memory pages in the first and second of sets of pages is greater than the file size;
    allocating a first portion of the available set of memory pages to the first set of pages and a second portion of the available set of memory pages to the second set of pages using the performance mode;
    receiving a file of the file transfer; and
    programming, using the allocation defined by the performance mode, a first portion of the file at the default bit density to the first portion of memory and a second portion of the file at the reduced bit density to the second portion of memory.

2. The method of claim 1 wherein selecting a performance mode from a plurality of performance modes comprises:
    selecting a set of trim settings, from a plurality of sets of trim settings, for the performance mode, wherein the set of trim settings includes one or more of: a programming pulse width, a programming voltage value, and a latency between programming pulses.

3. The method of claim 2, further comprising:
    computing an estimated latency for the programming using the set of trim settings, the first set of pages, and the second set of pages; and
    providing the estimated latency to the host.

4. The method of claim 1, wherein the default bit density is triple-level cell and the reduced bit density is single level cell.

5. The method of claim 1 further comprising:
in response to programming the first portion of the file to the first portion of memory and the second portion of the file to the second portion of memory, computing a remaining available memory for programming; and
updating an availability for each of the plurality of performance modes using the remaining available memory for programming.

6. The method of claim 5, further comprising:
receiving a request from the host to erase the first portion of the file and the second portion of the file;
in response to the request from the host to erase the first portion of the file and the second portion of the file, erasing the first portion of the file and the second portion of the file;
making an amount of the remaining available memory available for additional programming, the amount equal to the size of the first portion of the file and the second portion of the file; and
updating the availability for each of the plurality of performance modes using the remaining available memory for programming.

7. The method of claim 1, wherein the request to initialize the file transfer includes a requested quality of service that comprises at least a write performance.

8. A non-transitory computer-readable storage medium comprising instructions that, when executed by a processing device, cause the processing device to:
receive, by a memory subsystem, a request to initialize a file transfer from a host using wireless communication;
in response to the request, identify a size of the file transfer by the memory subsystem;
select a performance mode from a plurality of performance modes using the size of the file transfer and an available set of memory pages of the memory subsystem, wherein the performance mode indicates a first ratio of a first set of pages at a default bit density and a second set of pages at a reduced bit density, wherein a second performance mode of the plurality of performance modes indicates a second ratio, different from the first ratio, wherein the second ratio is of a third set of pages at the default bit density and a fourth set of pages at the reduced bit density, and wherein a combined amount of memory pages in the first and second of sets of pages is greater than the file size;
allocate a first portion of the available set of memory pages to the first set of pages and a second portion of the available set of memory pages to the second set of pages using the performance mode;
receive a file of the file transfer; and
program, using the allocation defined by the performance mode, a first portion of the file at the default bit density to the first portion of memory and a second portion of the file at the reduced bit density to the second portion of memory.

9. The non-transitory computer-readable storage medium of claim 8, wherein to select a performance mode from a plurality of performance modes, the processing device is further caused to:
select a set of trim settings, from a plurality of sets of trim settings, for the performance mode, wherein the set of trim settings includes one or more of: a programming pulse width, a programming voltage value, and a latency between programming pulses.

10. The non-transitory computer-readable storage medium of claim 9, the processing device further caused to:
compute an estimated latency for the programming using the set of trim settings, the first set of pages, and the second set of pages; and
provide the estimated latency to the host.

11. The non-transitory computer-readable storage medium of claim 8, wherein the default bit density is triple level cell and the reduced bit density is single level cell.

12. The non-transitory computer-readable storage medium of claim 8, the processing device further caused to:
in response to programming the first portion of the file to the first portion of memory and the second portion of the file to the second portion of memory, compute a remaining available memory for programming; and
update an availability for each of the plurality of performance modes using the remaining available memory for programming.

13. The non-transitory computer-readable storage medium of claim 12, the processing device further caused to:
receive a request from the host to erase the first portion of the file and the second portion of the file;
in response to the request from the host to erase the first portion of the file and the second portion of the file, erase the first portion of the file and the second portion of the file;
make an amount of the remaining available memory available for additional programming, the amount equal to the size of the first portion of the file and the second portion of the file; and
update the availability for each of the plurality of performance modes using the remaining available memory for programming.

14. The non-transitory computer-readable storage medium of claim 8, wherein the request to initialize the file transfer includes a requested quality of service that comprises at least a write performance.

15. A system comprising:
a plurality of memory devices; and
a processing device, operatively coupled with the plurality of memory devices, to:
receive, by a memory subsystem, a request to initialize a file transfer from a host using wireless communication;
in response to the request, identify a size of the file transfer by the memory subsystem;
select a performance mode from a plurality of performance modes using the size of the file transfer and an available set of memory pages of the memory subsystem, wherein the performance mode indicates a first ratio of a first set of pages at a default bit density and a second set of pages at a reduced bit density, wherein a second performance mode of the plurality of performance modes indicates a second ratio, different from the first ratio, wherein the second ratio is of a third set of pages at the default bit density and a fourth set of pages at the reduced bit density, and wherein a combined amount of memory pages in the first and second of sets of pages is greater than the file size;
allocate a first portion of the available set of memory pages to the first set of pages and a second portion of the available set of memory pages to the second set of pages using the performance mode;
receive a file of the file transfer; and
program, using the allocation defined by the performance mode, a first portion of the file at the default bit density to the first portion of memory and a second portion of the file at the reduced bit density to the second portion of memory.

16. The system of claim 15, wherein to select a performance mode from a plurality of performance modes, the processing device is further caused to:

selecta set of trim settings, from a plurality of sets of trim settings, for the performance mode, wherein the set of trim settings includes one or more of: a programming pulse width, a programming voltage value, and a latency between programming pulses.

17. The system of claim 16, the processing device further caused to:

compute an estimated latency for the programming using the set of trim settings, the first set of pages, and the second set of pages; and provide the estimated latency to the host.

18. The system of claim 15, wherein the default bit density is triple-level cell and the reduced bit density is single level cell.

19. The system of claim 15, the processing device further caused to:

in response to programming the first portion of the file to the first portion of memory and the second portion of the file to the second portion of memory, compute a remaining available memory for programming; and update an availability for each of the plurality of performance modes using the remaining available memory for programming.

20. The system of claim 19, the processing device further caused to:

receive a request from the host to erase the first portion of the file and the second portion of the file;

in response to the request from the host to erase the first portion of the file and the second portion of the file, erase the first portion of the file and the second portion of the file;

make an amount of the remaining available memory available for additional programming, the amount equal to the size of the first portion of the file and the second portion of the file; and update the availability for each of the plurality of performance modes using the remaining available memory for programming.

* * * * *